United States Patent
Saiki et al.

(10) Patent No.: US 10,475,268 B2
(45) Date of Patent: Nov. 12, 2019

(54) VEHICULAR ELECTRONIC KEY SYSTEM WITH DETERMINATION OF TRANSMISSION STRENGTH ADJUSTMENT

(71) Applicant: DENSO CORPORATION, Kariya, Aichi-pref. (JP)

(72) Inventors: Takashi Saiki, Kariya (JP); Hiromichi Naito, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 16/097,849

(22) PCT Filed: Apr. 12, 2017

(86) PCT No.: PCT/JP2017/014895
§ 371 (c)(1),
(2) Date: Oct. 31, 2018

(87) PCT Pub. No.: WO2017/191739
PCT Pub. Date: Nov. 9, 2017

(65) Prior Publication Data
US 2019/0147678 A1  May 16, 2019

(30) Foreign Application Priority Data
May 6, 2016 (JP) ................. 2016-093321

(51) Int. Cl.
*G07C 9/00* (2006.01)
*B60R 25/24* (2013.01)
(Continued)

(52) U.S. Cl.
CPC .......... *G07C 9/00309* (2013.01); *B60R 25/24* (2013.01); *B60R 25/248* (2013.01); *E05B 49/00* (2013.01); *H01Q 1/3241* (2013.01); *H04Q 9/00* (2013.01); *G07C 2009/00396* (2013.01); *G07C 2009/00555* (2013.01)

(58) Field of Classification Search
None
See application file for complete search history.

(56) References Cited

U.S. PATENT DOCUMENTS 9,995,061 B2 * 6/2018 Ishikawa ............... E05B 49/008

FOREIGN PATENT DOCUMENTS

JP 2010185186 A 8/2010

* cited by examiner

*Primary Examiner* — Daniell L Negron
(74) *Attorney, Agent, or Firm* — Harness, Dickey & Pierce, P.L.C.

(57) ABSTRACT

An in-vehicle system executes authentication of a mobile device multiple times from a parking state until an engine is started. The in-vehicle system operates in an alert mode when a vehicle is parked, and transmits an authentication signal including a strength change signal. When the in-vehicle system operates in an alert cancellation mode, the mobile device returns a response signal only when there is a change in the strength of the received authentication signal. When the in-vehicle system succeeds in authentication of the mobile device in an authentication process in the alert mode, the in-vehicle system shifts to the alert cancellation mode. When the in-vehicle system operates in the alert cancellation mode, the mobile device returns the response signal irrespective of whether there is the change in the strength of the received authentication signal.

3 Claims, 7 Drawing Sheets

(51) Int. Cl.
*H04Q 9/00* (2006.01)
*H01Q 1/32* (2006.01)
*E05B 49/00* (2006.01)

VEHICULAR ELECTRONIC KEY SYSTEM WITH DETERMINATION OF TRANSMISSION STRENGTH ADJUSTMENT

CROSS REFERENCE TO RELATED APPLICATIONS

This application is a U.S. National Phase Application under 35 U.S.C. 371 of International Application No. PCT/JP2017/014895 filed on Apr. 12, 2017. This application is based on and claims the benefit of priority from Japanese Patent Application No. 2016-093321 filed on May 6, 2016. The entire disclosures of all of the above applications are incorporated herein by reference.

TECHNICAL FIELD

The present disclosure relates to a vehicular electronic key system that carries out authentication of a mobile device by performing a wireless communication between an in-vehicle device mounted on a vehicle and the mobile device carried by a user.

BACKGROUND ART

Up to now, a vehicular electronic key system has been known in which an in-vehicle device mounted on a vehicle and a mobile device carried by a user perform an authentication process by a wireless communication, and the in-vehicle device executes a vehicle control such as vehicle door locking and unlocking and engine starting based on a success of the authentication process. In the vehicular electronic key system of that type, an arrival range of a radio signal transmitted by the in-vehicle device is limited to a short distance around the vehicle. This is because a situation in which the in-vehicle device carries out the wireless communication with the mobile device is limited to a case in which the mobile device is present in the vicinity of the vehicle.

However, the vehicular electronic key system described above causes concern about a relay attack that a third party with malicious intent indirectly realizes a communication between the mobile device and the in-vehicle device with the use of a repeater, thereby realizing unauthorized authentication of the mobile device by the in-vehicle device. If the relay attack succeeds, the vehicle control such as unlocking the vehicle door or starting the engine is executed even though an authorized user does not intend to execute the vehicle control.

On the other hand, various configurations for preventing such a relay attack have also been proposed. An in-vehicle device of a vehicular electronic key system disclosed in, for example, Patent Literature 1 transmits a radio signal including two types of power levels having a high level and a low level, and a mobile device sequentially detects a strength of a received signal (so-called RSSI: received signal strength indication). The mobile device returns the signal to the in-vehicle device only when the mobile device detects a change in strength of a predetermined level or higher in the received signal.

The relay attack countermeasure disclosed in Patent Literature 1 is a technology focused on a fact that a repeater used for the relay attack amplifies a radio wave of a frequency band to be relayed to a certain output level and transfers the amplified radio wave. In other words, when the radio wave transmitted from the in-vehicle device is relayed by the repeater, a level difference of the received signal which is to be originally detected is not detected. In other words, according to the configuration of Patent Literature 1, the mobile device can restrict a response from returning to the signal from the in-vehicle device relayed by the repeater. Naturally, unless the response from the mobile device is returned, the authentication is not established (that is, fails).

In general, because the strength of the signal attenuates according to a propagation distance, the RSSI detected by a receiver side is larger as a distance from a signal transmission source is smaller. Therefore, the mobile device receives the signal transmitted from the in-vehicle device with a larger strength as a distance between the mobile device and an antenna (hereinafter referred to as a vehicle-side transmission antenna) provided for the mobile device to transmit the signal is shorter.

PRIOR ART LITERATURES

Patent Literature

Patent Literature 1: JP 2010-185186 A

SUMMARY OF INVENTION

A circuit (hereinafter referred to as RSSI detection circuit) for detecting the RSSI of the received signal can be realized by a well-known circuit configuration. However, a range of a value that can be output as the RSSI (hereinafter referred to as "output range") is usually set for such an RSSI detection circuit.

For that reason, when a signal having a strength higher than a maximum value (in other words, an upper limit value) of the output range is received, the RSSI of the received signal is output as the upper limit value of the output range. For convenience sake, the signal strength corresponding to the upper limit value of the output range is referred to as "saturation level" hereinafter.

In the case where the mobile device is disposed in the vicinity of a vehicle-side transmission antenna, even if a power level of a signal is set to a low level, the mobile device may receive the signal at the saturation level. It is needless to say that when the signal transmitted at the low level reaches the mobile device at the saturation level, the signal transmitted at a high level also reaches the mobile device at the saturation level. In such a case, since the RSSI of both the signal transmitted at the high level and the signal transmitted at the low level is the upper limit value, a strength change of the received signal cannot be detected.

In other words, in the configuration of Patent Literature 1, when the mobile device is disposed at a position closer to the vehicle-side transmission antenna as the signal whose power level is set to the lower level can be received at the saturation level, the strength change cannot be detected in the received signal, resulting in an event that authentication fails. It is needless to say that when the authentication fails, a control that is to be executed at the time of successful authentication is not carried out, which may impair the user's convenience.

The present disclosure has been made in view of the above circumstance, and it is an object of the present disclosure to provide a vehicular electronic key system which is capable of restricting a reduction in user's convenience while restricting the possibility of unauthorized establishment of authentication in a wireless communication between an in-vehicle device and a mobile device.

A vehicular electronic key system according to an aspect of the present disclosure includes an in-vehicle device that is mounted on a vehicle and a mobile device that is associated with the in-vehicle device and carried by a user of the vehicle, and the in-vehicle device performs a predetermined control process to the vehicle when an authentication process by a wireless communication between the in-vehicle device and the mobile device is successful. The in-vehicle device has two operation modes including an alert mode and an alert cancellation mode. The in-vehicle device is set to execute the authentication process a plurality of times during a series of operations supposed to be executed by the user when the user boards the vehicle that is parked and starts a power source of the vehicle. The in-vehicle device includes a vehicle-side transmission unit that transmits an authentication signal used for authentication of the mobile device from a vehicle-side transmission antenna provided in the vehicle, a transmission strength adjustment unit that adjusts a strength of the authentication signal transmitted from the vehicle-side transmission antenna, and a mode control unit that controls the operation mode of the in-vehicle device. The authentication signal includes operation mode information indicating the operation mode of the in-vehicle device. When the in-vehicle device operates in the alert mode, the vehicle-side transmission unit transmits the authentication signal including a strength change signal that is a signal whose signal strength is changed with a predetermined pattern. The mode control unit sets the operation mode to the alert mode when the vehicle is parked, and switches the operation mode to the alert cancellation mode if the authentication of the mobile device is successful when the in-vehicle device operates in the alert mode. The mobile device includes a mobile device-side reception unit that receives the authentication signal through the mobile device-side reception antenna, a reception strength detection unit that sequentially detects a received signal strength of the signal received by the mobile device-side reception unit, a strength change determination unit that determines whether the strength change with the predetermined pattern occurs in a strength change region that is a portion corresponding to the strength change signal among the authentication signals when receiving the authentication signal indicating that the in-vehicle device operates in the alert mode, and a mobile device-side transmission unit that transmits a response signal that is a signal as a response to the authentication signal. When the mobile device-side reception unit receives the authentication signal indicating that the in-vehicle device operates in the alert cancellation mode, the mobile device-side transmission unit returns the response signal. When the mobile device-side reception unit receives the authentication signal indicating that the in-vehicle device operates in the alert mode, the mobile device-side transmission unit returns the response signal if the strength change determination unit determines that the strength change occurs, and the mobile device-side transmission unit does not return the response signal if the strength change determination unit determines that no strength change occurs in the strength change region.

In the above configuration, when the in-vehicle device operates in the alert mode, the in-vehicle device transmits the authentication signal including the strength change signal as in Patent Literature 1. Then, when the in-vehicle device operates in the alert mode, the mobile device returns the response signal to the authentication signal only when the received authentication signal contains the strength change. In other words, when the in-vehicle device operates in the alert mode, if the strength change is not detected in the received authentication signal, the in-vehicle device does not return the response signal. Therefore, as in Patent Literature 1, the possibility that the authentication in the wireless communication between the in-vehicle device and the mobile device is illegally established can be restricted.

In addition, when the in-vehicle device successfully authenticates the mobile device by the authentication process in the alert mode, the in-vehicle device shifts to the alert cancellation mode. When the in-vehicle device operates in the alert cancellation mode, the mobile device does not consider whether there is a change in strength in the determination of whether to transmit the response signal to the received authentication signal.

Therefore, after the authentication of the mobile device by the authentication process in the alert mode has succeeded once among the authentication processes to be executed multiple times in the series of operations executed by the user to start the power source, the authentication process does not fail due to the fact that the change in the strength cannot be detected in the received signal. The ability to reduce a risk of failure of the authentication process contributes to an improvement in the user's convenience.

In other words, according to the configuration described above, a reduction in the user's convenience can be restricted while the possibility that the authentication in the wireless communication between the in-vehicle device and the mobile device is illegally established is reduced.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
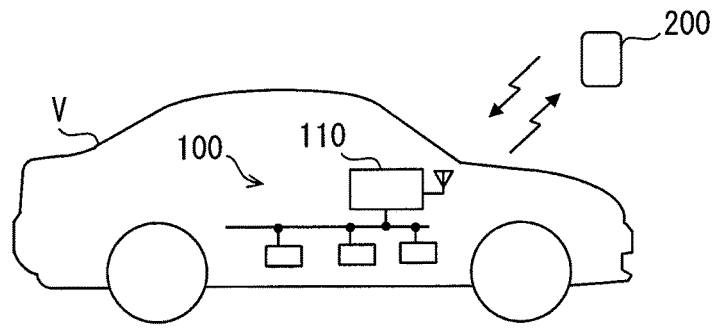
FIG. 1 is a block diagram showing a schematic configuration of a vehicular electronic key system according to an embodiment of the present disclosure.

Hereinafter, embodiments of the present disclosure will be described with reference to the accompanying drawings. FIG. 1 is a diagram showing an example of a schematic configuration of a vehicular electronic key system according to the present embodiment. As shown in FIG. 1, the vehicular electronic key system includes an in-vehicle system 100 that is mounted on a vehicle V and a mobile device 200 that is carried by a user of the vehicle V. The mobile device 200 is associated with the in-vehicle system 100 and has a function as a key unique to the vehicle V.

For the sake of convenience, the vehicle V on which the in-vehicle system 100 is mounted will also be described as a subject vehicle in the following description. In the present embodiment, the subject vehicle is assumed to be an engine vehicle including only an engine as a power source, but is not limited to the engine vehicle. The subject vehicle may be configured by a so-called hybrid vehicle including an engine and a motor as a power source, or an electric vehicle including only a motor as a power source.

<Outline of Vehicular Electronic Key System>

Each of the in-vehicle system 100 and the mobile device 200 has a function to realize a well-known remote keyless entry (hereinafter referred to as RKE) system. More specifically, the mobile device 200 includes multiple switches 230 operated by the user, and transmits a command signal corresponding to the switch 230 operated by the user to the in-vehicle system 100.

Upon receiving the command signal transmitted from the mobile device 200, the in-vehicle system 100 executes a vehicle control according to the received command signal. For example, the in-vehicle system 100 controls a locked state (that is, locking and unlocking) of the vehicle door based on the command signal transmitted from the mobile device 200.

In addition, each of the in-vehicle system 100 and the mobile device 200 has a function to execute a wireless communication with the use of the radio wave of a predetermined frequency band for realizing a well-known smart entry system.

More specifically, the in-vehicle system 100 has a function of transmitting a signal of a predetermined LF (low frequency) band in a predetermined range in a vehicle interior and around the vehicle and a function of receiving a signal of a predetermined RF (radio frequency) band transmitted from the mobile device 200. The mobile device 200 has a function of receiving the signal of the LF band transmitted from the in-vehicle system 100 and a function of returning the signal of the predetermined RF band to the in-vehicle system 100.

Radio waves in a frequency band other than the LF band may be used for signal transmission from the in-vehicle system 100 to the mobile device 200. Similarly, the radio waves in a frequency band other than the RF band may be used for signal transmission from the mobile device 200 to the in-vehicle system 100. A range in which the LF band signal transmitted by the in-vehicle system 100 propagates while maintaining the signal strength receivable by the mobile device 200 is referred to as an LF communication area. The LF communication area may be appropriately designed. As an example, the LF communication area in a vehicle exterior falls within a range of several meters from the vehicle.

In the configuration described above, when the mobile device 200 is present in the LF communication area, the in-vehicle system 100 executes the authentication process by a wireless communication with the mobile device 200, and executes various controls for performing door locking and unlocking, engine starting and the like based on the establishment of authentication. In this example, the authentication process is a process in which the in-vehicle system 100 confirms that a communication terminal (hereinafter referred to as a communication target) that implements a wireless communication with the subject in-vehicle system 100 is the mobile device 200 (that is, a legitimate mobile device 200) associated with the subject in-vehicle system 100. The fact that the authentication is established corresponds to determination that the communication terminal is the legitimate mobile device 200.

The in-vehicle system 100 authenticates the mobile device 200 by the wireless communication, as a result of which the user carrying the mobile device 200 can realize the locking and unlocking the door, the starting and stopping of the engine, and so on without operating the mobile device 200 as a key. The authentication of the mobile device 200 by the in-vehicle system 100 may be performed by a well-known challenge response method. Details of the authentication process will be described later. As a preparation for the authentication process, the mobile device 200 and the in-vehicle system 100 each store a common encryption key used for the authentication process. In addition, a unique identification number (hereinafter referred to as a mobile device ID) is assigned to the mobile device 200, and the mobile device ID is registered in the in-vehicle system 100. The mobile device ID may be used as the encryption key described above.

<Configuration of Vehicle System 100>

Figure 2:
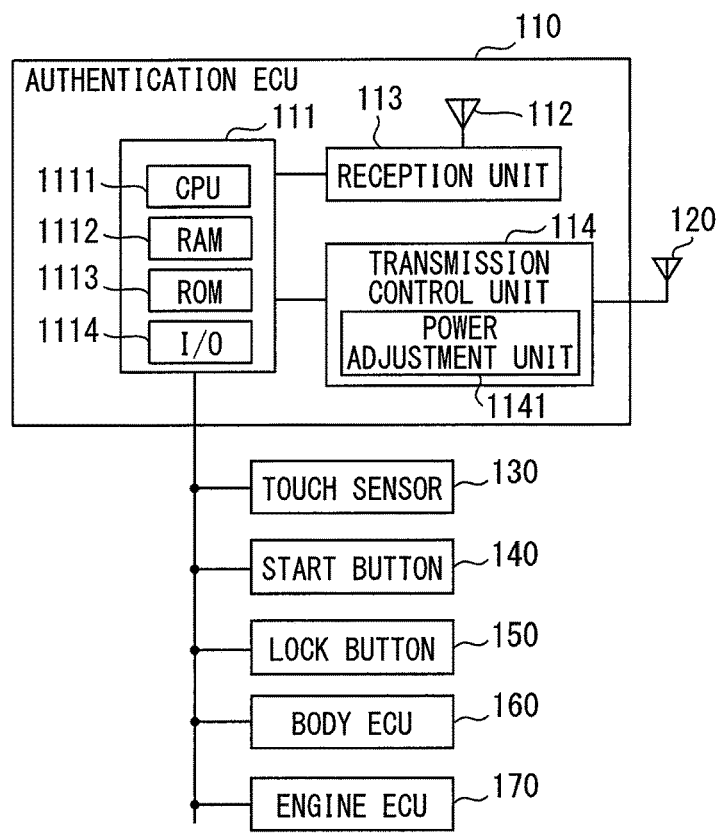
FIG. 2 is a block diagram showing a schematic configuration of an in-vehicle system.

Next, the configuration of the in-vehicle system 100 will be described. As shown in FIG. 2, the in-vehicle system 100 includes an authentication ECU 110, a vehicle-side transmission antenna 120, a touch sensor 130, a start button 140, a lock button 150, a body ECU 160, and an engine ECU 170.

The authentication ECU 110 is electrically connected to the vehicle-side transmission antenna 120. In addition, the authentication ECU 110 is connected to each of the touch sensor 130, the start button 140, the lock button 150, the body ECU 160, and the engine ECU 170 through a LAN (local area network) built in the vehicle in a manually communicable manner.

The authentication ECU 110 is an ECU (ECU: electronic control unit) that executes various processes for realizing the above-described smart entry system and an RKE system (hereinafter referred to as a keyless entry system or the like). The authentication ECU 110 corresponds to an in-vehicle device. In the present embodiment, two types of operation modes including an alert mode and an alert cancellation mode are set in the authentication ECU 110.

The alert mode is an operation mode for authenticating the mobile device 200 by an authentication method that introduces a mechanism (that is, a relay attack countermeasure) for restricting the authentication from illegally succeeding by a relay attack. The alert cancellation mode is an operation mode in which the mobile device 200 is authenticated without performing the relay attack countermeasure taken in the alert mode. Details of the operation of the authentication ECU 110 in each operation mode and the relay attack countermeasure will be described later.

For the mobile device 200, the operation mode of the authentication ECU 110 corresponds to the operation mode of the in-vehicle system 100. Therefore, a state that the authentication ECU 110 operates in the alert mode is also referred to as a state that the in-vehicle system 100 operates in the alert mode hereinafter. The same is applied to the alert cancellation mode.

The authentication ECU 110 includes a vehicle-side control unit 111, a vehicle-side reception antenna 112, a vehicle-side reception unit 113, and a transmission control unit 114 as finer components.

The vehicle-side control unit 111 is configured as a normal computer including a CPU 1111, a RAM 1112, a ROM 1113, an I/O 1114, and a bus line that connects those components to each other. The ROM 1113 stores a program (hereinafter referred to as a vehicle program) for causing the normal computer to function as the vehicle-side control unit 111, and the like.

The vehicle program described above may be stored in a non-transitory tangible storage medium, and a specific storage medium is not limited to a ROM. Execution of the vehicle program by the CPU 1111 corresponds to execution of a method corresponding to the vehicle program. The vehicle-side control unit 111 realizes a smart entry system or the like by causing the CPU 1111 to execute the vehicle program. Details of the vehicle-side control unit 111 will be described later.

The vehicle-side reception antenna 112 is an antenna for receiving the radio wave in the RF band. The vehicle-side reception antenna 112 converts the received radio wave into an electric signal and provides the converted electric signal to the vehicle-side reception unit 113. The vehicle-side reception unit 113 subjects the signal input from the vehicle-side reception antenna 112 to predetermined processing such as analog-to-digital conversion, demodulation, and decoding to extract data included in the received signal. Then, the vehicle-side reception unit 113 provides the extracted data to the vehicle-side control unit 111.

The transmission control unit 114 subjects the data input from the vehicle-side control unit 111 to predetermined processing such as encoding, modulation, and digital-to-analog conversion and converts the input data into a carrier signal. Then, the transmission control unit 114 outputs the carrier signal to the vehicle-side transmission antenna 120 and radiates the output carrier signal as the radio wave.

In addition, the transmission control unit 114 includes a power adjustment unit 1141 that adjusts a transmission power of the carrier signal (in other words, the strength of the transmission signal) as a more detailed function. With the power adjustment unit 1141, the transmission control unit 114 can change the transmission power of the signal to be transmitted to the mobile device 200 to an arbitrary level and transmit the transmission power. At least the power adjustment unit 1141 according to the present embodiment may be configured to be able to adjust the output level in two stages of a default level and a suppression level.

The default power is the transmission power to be employed at the time of normal signal transmission. The normal transmission time corresponds to a case of transmitting a signal including information, specifically, a case of transmitting an information signal Sa to be described later, or the like. The default power may be designed appropriately. The suppression level may be appropriately designed to a value having a significant difference from the default power in a range smaller than the default power. For example, the suppression level may be half of the default level.

The power adjustment unit 1141 may be realized with the use of a known attenuator that attenuates a signal or a variable gain amplifier that can adjust the amplification degree. For example, the power adjustment unit 1141 may be configured to adjust the transmission power by connecting or disconnecting the attenuator to or from a signal propagation system with the use of a switch.

The transmission control unit 114 operates in a different mode according to the operation mode of the authentication ECU 110 in the authentication process. Details of the operation of the transmission control unit 114 at the time of the authentication process will be described later. The transmission control unit 114 corresponds to a vehicle-side transmission unit, and the power adjustment unit 1141 corresponds to a transmission strength adjustment unit.

The vehicle-side transmission antenna 120 is an antenna for converting the carrier signal input from the authentication ECU 110 (more specifically, the transmission control unit 114) into the radio wave in the LF band and radiating the radio wave to a space. The multiple vehicle-side transmission antennas 120 are provided in multiple locations appropriately designed so that a predetermined range in the vehicle exterior of the vehicle V and an entire area in the vehicle interior are included in the LF communication area.

Figure 3:
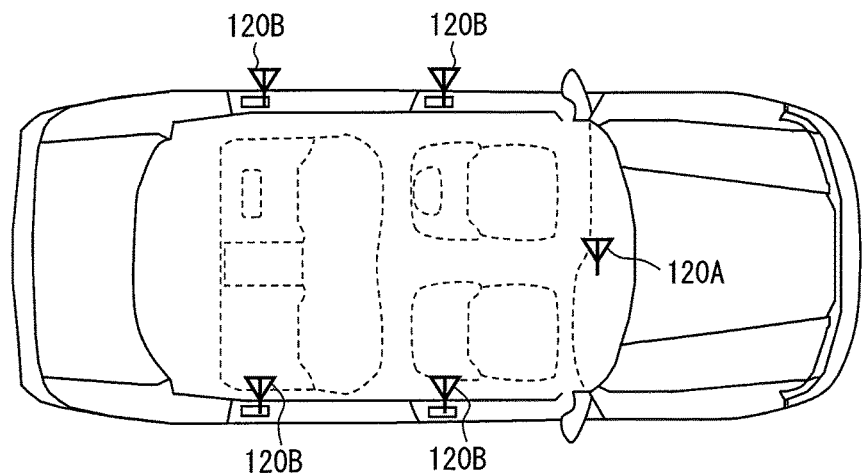
FIG. 3 is a diagram showing an example of an installation position of a vehicle-side transmission antenna.

In the present embodiment, as an example, the vehicle V is provided with one vehicle interior antenna 120A and multiple vehicle exterior antennas 120B as the vehicle-side transmission antenna 120 as shown in FIG. 3. It should be noted that the transmission area of a certain vehicle-side transmission antenna 120 to be described later is an area at which the signal transmitted from the vehicle-side transmission antenna 120 arrives while keeping the signal strength receivable (in other words, decodable) by the mobile device 200. A collection of the transmission areas of the respective vehicle-side transmission antennas 120 corresponds to an LF communication area for the vehicle V.

The vehicle interior antenna 120A is a vehicle-side transmission antenna 120 disposed in the vehicle interior so that the vehicle interior is set as the transmission area. The vehicle interior antenna 120A is installed so as to include at least a periphery of a driver's seat in the transmission area. For example, the vehicle interior antenna 120A may be provided in a center of an instrument panel in a vehicle width direction or in the vicinity of a center console box. In another mode, multiple vehicle interior antennas 120A may be provided.

The vehicle exterior antennas 120B are vehicle-side transmission antennas 120 installed so as to include a predetermined range in the vehicle exterior in the transmission area. For example, the vehicle exterior antennas 120B may be provided in the vicinity of handles of the respective doors provided in the vehicle V (including the inside of the handles).

It is needless to say that the installation position and the transmission area of the vehicle-side transmission antenna 120 mounted on the vehicle V are not limited to the embodiment described above. In addition to the above configuration, the vehicle V may be provided with the vehicle-side transmission antenna 120 having the transmission area in a trunk. The installation position and installation number, and so on of the vehicle-side transmission antenna 120 may be appropriately designed so as to provide a desired transmission area.

The touch sensor 130 is installed in each door handle of the vehicle and detects that the user touches the door handle. The detection results of the respective touch sensors 130 are sequentially output to the authentication ECU 110.

The start button 140 is a push switch for the user to start the engine. When a push operation is performed by the user, the start button 140 outputs a control signal indicating that the start button 140 is pushed to the vehicle-side control unit 111.

The lock button 150 is a button for the user to lock the door of the vehicle. The lock button 150 may be provided on each door handle of the vehicle V. When the user presses the lock button 150, the lock button 150 outputs a control signal indicating that the lock button 150 is pushed to the authentication ECU 110.

The body ECU 160 is an ECU that controls various actuators mounted on the vehicle. For example, the body ECU 160 outputs a drive signal for controlling the locking and unlocking of the door provided in the vehicle to a door locking motor provided in each vehicle door based on an instruction from the authentication ECU 110, and locks and unlocks each door. Further, the body ECU 160 acquires information indicating the opening or closing state of each door provided in the vehicle, the locked or unlocked state of each door, or the like. The opening or closing state of the door may be detected by a courtesy switch.

The engine ECU 170 is an ECU that controls the operation of the engine. For example, when the engine ECU 170 acquires a start instruction signal instructing starting of the engine from the authentication ECU 110, the engine ECU 170 starts the engine.

<Function of Vehicle-Side Control Unit 111>

Figure 4:
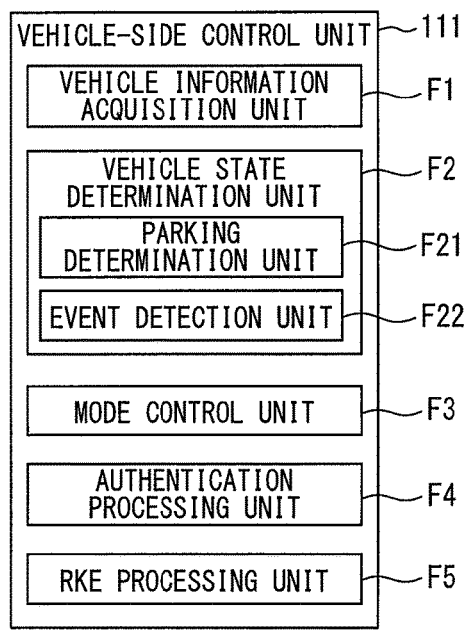
FIG. 4 is a functional block diagram showing a schematic configuration of a vehicle-side control unit.

As shown in FIG. 4, the vehicle-side control unit 111 includes a vehicle information acquisition unit F1, a vehicle state determination unit F2, a mode control unit F3, an authentication processing unit F4, and an RKE processing unit F5 as functional blocks realized by execution of the above-described vehicle program by the CPU. Meanwhile, some or all of the functions of the vehicle-side control unit 111 may be realized by hardware with the use of one or multiple ICs or the like.

The vehicle information acquisition unit F1 acquires various information (that is, vehicle information) indicating a state of the vehicle from sensors and ECUs mounted on the vehicle such as the touch sensor 130. The vehicle information is indicative of, for example, whether the user touches the door handle, an opening or closing state of the door, whether the brake pedal is stepped on, whether the start button 140 is pushed down, a locked or unlocked state of each door, and so on.

Whether the user touches the door handle can be acquired from the touch sensor 130 and whether the start button 140 is pushed down can be determined according to a signal output from the start button 140. The opening or closing state of the door, the locked or unlocked state of each door, and the like can be acquired from the body ECU 160, for example. The opening or closing state of the door may be detected by a courtesy switch. Whether the brake pedal is stepped on can be detected by a brake pedal sensor that detects a stepped amount of the brake pedal by the user.

The information included in the vehicle information is not limited to the information described above. A shift position detected by a shift position sensor not shown, an operation state of a parking brake, and so on are also included in the vehicle information.

The vehicle state determination unit F2 determines a condition of the vehicle V based on the vehicle information acquired by the vehicle information acquisition unit F1. The vehicle state determination unit F2 includes a parking determination unit F21 and an event detection unit F22 as finer functional blocks.

The parking determination unit F21 determines whether the vehicle V is parked based on the vehicle information acquired by the vehicle information acquisition unit F1. For example, the parking determination unit F21 determines that the vehicle is parked when the engine is off and all the doors are closed and locked. It is needless to say that a well-known algorithm can be employed as a determination algorithm for determining whether the vehicle is parked. For the sake of convenience, a state in which the vehicle is parked is described as a parking state, and a state in which the vehicle is not parked is described as a non-parking state.

The event detection unit F22 detects that the vehicle V has transitioned from the non-parking state to the parking state or that a predetermined user's operation has been performed on the vehicle V as an authentication execution event. The authentication execution event is an event registered in advance as an event to execute the authentication process.

As an example, the event detection unit F22 detects that the door has been opened, that the door has been closed, that the brake pedal has been stepped on, that the start button 140 has been pushed down, that the operation of locking the door of the vehicle (hereinafter referred to as locking operation) has been executed by the user, that the vehicle V has been parked, and the like.

In another configuration, the event detection unit F22 may detect that the parking brake has been released, that a seat belt for the driver's seat has been attached, and that the user is seated in the driver's seat as an authentication execution event. In other words, the authentication ECU 110 may be configured to transmit the authentication signal when the parking brake has been released, when the seat belt for the driver's seat has been attached, and when it is detected that the user has been seated in the driver's seat.

The mode control unit F3 is a functional block that controls the operation mode of the authentication ECU 110. The authentication ECU 110 switches the operation mode of the authentication ECU 110 based on the detection result of the event detection unit F22 and the result of the authentication process by the authentication processing unit F4 to be described later.

More specifically, when the event detection unit F22 detects that the vehicle V has shifted from the non-parking state to the parking state, the mode control unit F3 sets the operation mode to the alert mode. As a result, when the vehicle V is parked, the authentication ECU 110 operates in the alert mode.

In addition, the mode control unit F3 according to the present embodiment also sets the operation mode to the alert mode even when all the doors of the vehicle V have been locked. Locking of all the doors may be realized as a function of a smart entry system resulting from push down of the lock button 150 or may be locked by the RKE system. In addition, the doors may be locked with the use of a mechanical key. In any case, the locking of all the doors means a locking operation for the user to separate from the vehicle.

As another mode, the mode control unit F3 does not have to shift to the alert mode just because all the doors of the vehicle V have been locked. For example, according to the well-known method, when it is detected that the mobile device 200 is in the vehicle exterior and all the doors have been locked, the mode may be shifted to the alert mode.

Furthermore, when it is determined that the authentication is successful in the authentication process executed when the operation mode is the alert mode, the mode control unit F3 switches the operation mode to the alert cancellation mode. Once the operation mode is switched to the alert cancellation mode, the operation mode is maintained until the vehicle V is parked.

The authentication processing unit F4 cooperates with the transmission control unit 114 and performs the authentication process by the wireless communication with the mobile device 200. The conditions under which the authentication processing unit F4 performs the authentication process may be appropriately designed.

For example, when the vehicle V is parked, the authentication processing unit F4 transmits a polling signal from the vehicle-side transmission antenna 120 in a predetermined cycle (for example, 200 milliseconds) in cooperation with the transmission control unit 114. The polling signal is a signal that requests the mobile device 200 to respond. By receiving a response signal to the polling signal, the authentication processing unit F4 can detect that the communication terminal possibly being the mobile device 200 is present in the wireless communication area.

When receiving the response signal to the polling signal, the authentication processing unit F4 causes the transmission control unit 114 to transmit a signal (that is, an authentication signal) for authenticating the mobile device 200. The authentication signal includes operation mode information indicating the operation mode of the authentication ECU 110 and a challenge code.

The challenge code is a code for authenticating the mobile device 200. The challenge code may be a random number generated with the use of a random number table or the like. When the mobile device 200 receives the challenge code, the mobile device 200 encrypts the challenge code with a previously registered encryption key and returns a signal (hereinafter referred to as a response signal) including the encrypted code (hereinafter referred to as a response code). In other words, the authentication signal functions as a signal requesting the mobile device 200 to return the response signal. The response signal corresponds to a response signal.

In addition, the authentication processing unit F4 transmits the authentication signal and generates a code (hereinafter referred to as a verification code) obtained by encrypting the challenge code with the use of the encryption key held by the authentication processing unit F4 per se. When the returned response code matches the verification code, the authentication processing unit F4 determines that a communication partner is a legitimate mobile device 200 (that is, the authentication is determined to be successful).

In the present embodiment, as an example, the authentication signal is transmitted when the response signal to the polling signal is received, but the present disclosure is not limited to the above configuration. The authentication signal may be periodically transmitted as the polling signal. In other words, with the inclusion of the challenge code in the polling signal, the polling signal may function as the authentication signal. The processes from the transmission of the authentication signal to the verification of the code correspond to an authentication process.

It is needless to say that a timing at which the authentication processing unit F4 executes the authentication process is not limited to the case in which the vehicle V is parked. In addition to the time when the response to the polling signal is received, as an example, the authentication process is executed at the respective timings when the door for the driver's seat is opened, when the door for the driver's seat is closed, when the brake pedal is stepped on, when the start button 140 is pushed down, and when the locking operation is executed. The occurrence of the events listed above can be detected by the event detection unit F22.

The contents of the control process performed by the authentication processing unit F4 when the authentication process is successful are contents corresponding to a scene when the authentication process is successful (in other words, the condition of the vehicle V). For example, when the authentication is successful in the parked state, the authentication processing unit F4 brings the door into an unlocking ready state. The unlocking ready state is a state in which the user can unlock the door by merely touching the touch sensor 130 of the door. Then, when a signal indicating that the user touches the touch sensor 130 is input from the touch sensor 130, the authentication processing unit F4 unlocks the key of the door in cooperation with the body ECU 160.

Further, in the case where the authentication process executed with the press of the start button 140 as a trigger is successful, the authentication processing unit F4 instructs the engine ECU 170 to start the engine. In the case where the authentication process executed with the execution of the locking operation as a trigger is successful, the authentication processing unit F4 may lock all the doors of the vehicle.

The RKE processing unit F5 implements processing on the vehicle-side for realizing the RKE system described above. Specifically, the RKE processing unit F5 analyzes the contents of the command signal transmitted from the mobile device 200, and executes a vehicle control corresponding to the command signal in cooperation with the body ECU 160 or the like. The vehicle control corresponding to the command signal includes, for example, door locking and unlocking, illumination lighting, startup of an air conditioning system mounted on the vehicle, and the like.

<Details of Operation of Transmission Control Unit 114 at Authentication Process>

Now, the operation of the transmission control unit 114 at the authentication process will be described in more detail. The transmission control unit 114 generates the authentication signal having a different signal pattern according to the operation mode of the authentication ECU 110 and causes the generated authentication signal to be transmitted from the vehicle-side transmission antenna 120.

Figure 5:
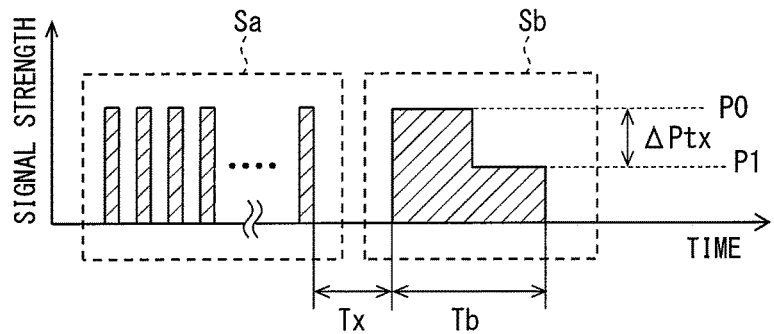
FIG. 5 is a chart showing one example of a schematic signal waveform of an authentication signal.

Specifically, as shown in FIG. 5, when the authentication ECU 110 operates in the alert mode, the transmission control unit 114 generates and transmits an authentication signal including an information signal Sa including the operation mode information and a challenge code and a strength change signal Sb whose signal strength is changed in the middle. In the chart shown in FIG. 5, an axis of abscissa represents a time and an axis of ordinate represents a signal strength (in other words, transmission power).

A signal length Tb of the strength change signal Sb, a time point at which the signal strength is changed in the subject signal, and the pattern for changing the strength are fixed. In other words, the signal pattern (in other words, a signal waveform) of the strength change signal Sb is kept constant.

As an example, the transmission control unit 114 operates the power adjustment unit 1141 such that the signal pattern of the strength change signal becomes initially in a default level P0 where the strength is relatively high, and becomes in a suppression level P1 where the strength is relatively low in the middle. As a result, the signal strength of the strength change signal changes stepwise from P0 to P1.

An interval Tx from an end of the information signal Sa to a start of the strength change signal Sb is also fixed. The position of the strength change signal Sb in the authentication signal is kept constant as described above, as a result of which when the mobile device 200 receives the authentication signal from the authentication ECU 110 operating in the alert mode, the mobile device 200 can identify a signal portion of the received signal corresponding to the strength change signal.

Figure 6:
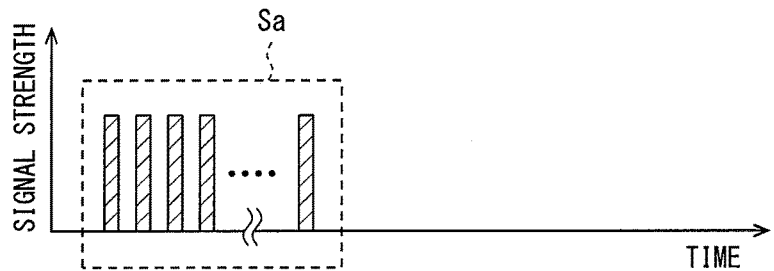
FIG. 6 is a chart showing another example of the schematic signal waveform of the authentication signal.

On the other hand, when the authentication ECU 110 operates in the alert cancellation mode, the transmission control unit 114 generates and transmits the authentication signal not including the strength change signal Sb as shown in FIG. 6. In other words, the authentication signal transmitted when the authentication ECU 110 operates in the alert cancellation mode is only the information signal Sa.

Hereinafter, for the sake of convenience, the authentication signal including the strength change signal Sb, which is transmitted when the authentication ECU 110 operates in the alert mode, will also be referred to as a change addition signal. Also, the authentication signal not including the strength change signal Sb, which is transmitted when the authentication ECU 110 operates in the alert cancellation mode, will also be referred to as a non-addition signal. However, if the change addition signal and the non-addition signal are not particularly distinguished from each other, those signals will be referred to as authentication signals.

In addition, the authentication process using the change addition signal (in other words, the authentication process in the alert mode) will be referred to as an alert mode authentication process, and the authentication process using the non-additional signal (in other words, the authentication process in the alert cancellation mode) will be referred to as a cancellation mode authentication process.

<Configuration and Operation of Mobile Device 200>

Figure 7:
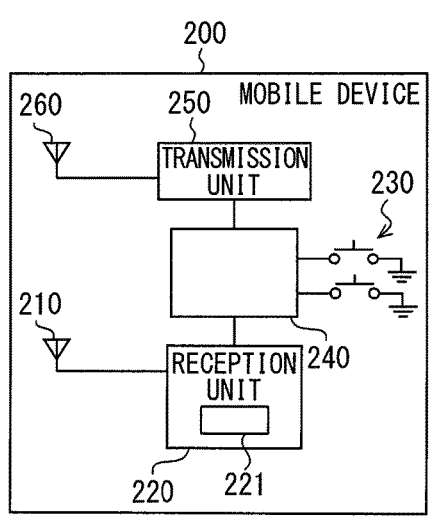
FIG. 7 is a block diagram showing a schematic configuration of a mobile device.

Next, the configuration of the mobile device 200 will be described. As shown in FIG. 7, the mobile device 200 includes a mobile device-side reception antenna 210, a mobile device-side reception unit 220, a switch 230, a mobile device-side control unit 240, a mobile device-side transmission unit 250, and a mobile device-side transmission antenna 260. The mobile device-side control unit 240, the mobile device-side reception unit 220, the switch 230, and the mobile device-side transmission unit 250 are communicably connected to each other.

The mobile device-side reception antenna 210 is an antenna for receiving the radio wave in the LF band. The mobile device-side reception antenna 210 is connected to the mobile device-side reception unit 220, converts the received radio wave into an electric signal, and outputs the converted electric signal to the mobile device-side reception unit 220.

The mobile device-side reception unit 220 subjects the signal input from the mobile device-side reception antenna 210 to predetermined processing such as analog-to-digital conversion, demodulation, and decoding to extract data included in the received signal. Then, the mobile device-side reception unit 220 provides the extracted data to the mobile device-side control unit 240.

In addition, the mobile device-side reception unit 220 includes an RSSI detection circuit 221 that sequentially detects a received signal strength (RSSI: received signal strength indication) which is the strength of a signal received by the mobile device-side reception antenna 210. The RSSI detection circuit 221 may be realized by a well-known circuit configuration. The RSSI detected by the RSSI detection circuit 221 is provided to the mobile device-side control unit 240. An output range of the RSSI detection circuit 221 may be appropriately designed. For convenience sake, the signal strength corresponding to the upper limit value of the output range is referred to as "saturation level". The RSSI detection circuit 221 corresponds to a reception strength detection unit.

The switch 230 is a switch for the user to use the function implemented as the RKE system. The mobile device 200 includes, for example, as the switch 230, a switch 230 for locking all the doors, and a switch 230 for unlocking all the doors. When various switches 230 are pushed by the user, the switches 230 output a control signal indicating that the switch 230 is pushed to the mobile device-side control unit 240.

In response to the control signal input from the switch 230, the mobile device-side control unit 240 detects that the user's operation for controlling the locked state such as the locking and unlocking of the various doors provided in the vehicle has been executed, and can identify the instruction contents. In FIG. 7, for convenience sake, only two switches 230 are illustrated, but the number of switches 230 is not limited to two. For example, the switch 230 for instructing to unlock only a trunk door may be provided.

The mobile device-side control unit 240 mainly includes a computer including a CPU, a RAM, a ROM, an I/O, and so on not shown. The ROM stores a program (hereinafter referred to as a mobile device program) for causing an ordinary computer to function as the mobile device-side control unit 240. The mobile device-side control unit 240 realizes a smart entry system or the like by executing the mobile device program stored in the ROM by the CPU. In addition to the above program, an encryption key and the like used for generating a response code in the authentication process are stored in the ROM. Detailed functions of the mobile device-side control unit 240 will be described later.

The mobile device-side transmission unit 250 subjects a baseband signal input from the mobile device-side control unit 240 to predetermined processing such as encoding, modulation, and digital-to-analog conversion and converts the baseband signal into a carrier signal. Then, the mobile device-side transmission unit 250 outputs the generated carrier signal to the mobile device-side transmission antenna 260. The mobile device-side transmission antenna 260 converts a signal input from the mobile device-side transmission unit 250 into the radio wave in the RF band and radiates the radio wave to a space.

<Function of Mobile Device-Side Control Unit 240>

Figure 8:
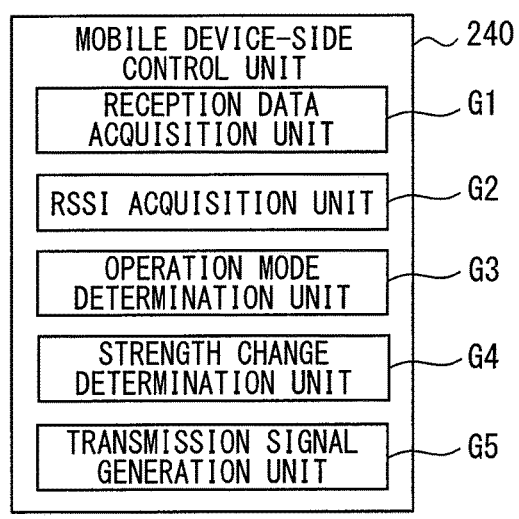
FIG. 8 is a functional block diagram showing a schematic configuration of a mobile device-side control unit.

As shown in FIG. 8, the mobile device-side control unit 240 includes, as functional blocks realized by executing the mobile device program described above, a reception data acquisition unit G1, an RSSI acquisition unit G2, an operation mode determination unit G3, a strength change determination unit G4, and a transmission signal generation unit G5. Incidentally, a part or all of the functional blocks included in the mobile device-side control unit 240 may be realized as hardware using one or more ICs or the like.

The reception data acquisition unit G1 acquires the data received by the mobile device-side reception unit 220. More specifically, if the mobile device-side reception unit 220 receives the authentication signal, the reception data acquisition unit G1 acquires the data obtained by demodulating the information signal Sa included in the received authentication signal.

The RSSI acquisition unit G2 acquires the RSSI detected by the RSSI detection circuit 221. The acquired RSSI is stored in a RAM in time series order with time stamp indicating an acquisition time. For convenience sake, the RSSI stored in the RAM is referred to as RSSI data.

The operation mode determination unit G3 determines the operation mode of the in-vehicle system 100 based on the operation mode information included in the authentication signal (more specifically, the information signal Sa). In other words, the operation mode determination unit G3 determines whether the received authentication signal is an authentication signal indicating that the in-vehicle system 100 operates in the alert mode or an authentication signal indicating that the in-vehicle system 100 operates in the alert cancellation mode.

When receiving the authentication signal indicating that the in-vehicle system 100 operates in the alert mode by the operation mode determination unit G3, the strength change determination unit G4 determines whether a strength change equal to or higher than a predetermined detection threshold occurs in a portion corresponding to the strength change signal Sb of the received authentication signal (hereinafter referred to as an strength change region). The detection threshold introduced in this example may be appropriately designed to a value corresponding to an initial strength change amount ΔPtx, which is a difference between the default level and the suppression level. For example, the detection threshold may be set to a value corresponding to ¼ of the initial strength change amount ΔPtx.

As described above, the strength change region in the authentication signal can be identified from the configuration of the signal pattern. Further, a transition of the RSSI in the strength change region can be identified by referring to the RSSI data stored in the RAM. The determination result of the strength change determination unit G4 is provided to the transmission signal generation unit G5.

The transmission signal generation unit G5 generates a signal to be transmitted to the in-vehicle system 100, and outputs the generated signal to the mobile device-side transmission unit 250. As described above, the signal output to the mobile device-side transmission unit 250 is subjected to predetermined signal processing and transmitted from the mobile device-side transmission antenna 260.

For example, when the mobile device-side reception unit 220 receives the authentication signal indicating that the in-vehicle system 100 operates in the alert cancellation mode, the transmission signal generation unit G5 generates a response code corresponds to the challenge code included in the subject signal. Then, the transmission signal generation unit G5 outputs a response signal including the response code to the mobile device-side transmission unit 250.

When the transmission signal generation unit G5 receives the authentication signal indicating that the in-vehicle system 100 operates in the alert mode, the transmission signal generation unit G5 determines whether the response signal is returned according to whether the strength change that is equal to or higher than a predetermined detection threshold occurs in the strength change region. More specifically, when the in-vehicle system 100 receives the authentication signal indicating that the in-vehicle system 100 operates in the alert mode, further when the strength change determination unit G4 determines that the strength change occurs in the strength change region, the transmission signal generation unit G5 generates the response signal, and outputs the generated response signal to the mobile device-side transmission unit 250.

On the other hand, in the case of receiving the authentication signal indicating that the in-vehicle system 100 operates in the alert mode, when the strength change determination unit G4 detects no strength change in the strength change region, no response signal is generated. According to the configuration described above, the same advantages as those of Patent Literature 1 are obtained. In other words, unauthorized authentication success due to relay attack can be restricted.

In addition, when the mobile device-side reception unit 220 receives the polling signal, the transmission signal generation unit G5 generates a predetermined signal to be transmitted as a response to the polling signal, and outputs the generated signal to the mobile device-side transmission unit 250. When the control signal indicating that the user presses the switch 230 is input from a certain switch 230, the transmission signal generation unit G5 generates a command signal instructing to execute the vehicle control corresponding to the switch 230 that outputs the control signal. For example, when the switches 230 for unlocking all the doors are pushed, the transmission signal generation unit G5 generates the command signal instructing to open all the doors and outputs the generated command signal to the mobile device-side transmission unit 250.

<Boarding Related Process>

Figure 9:
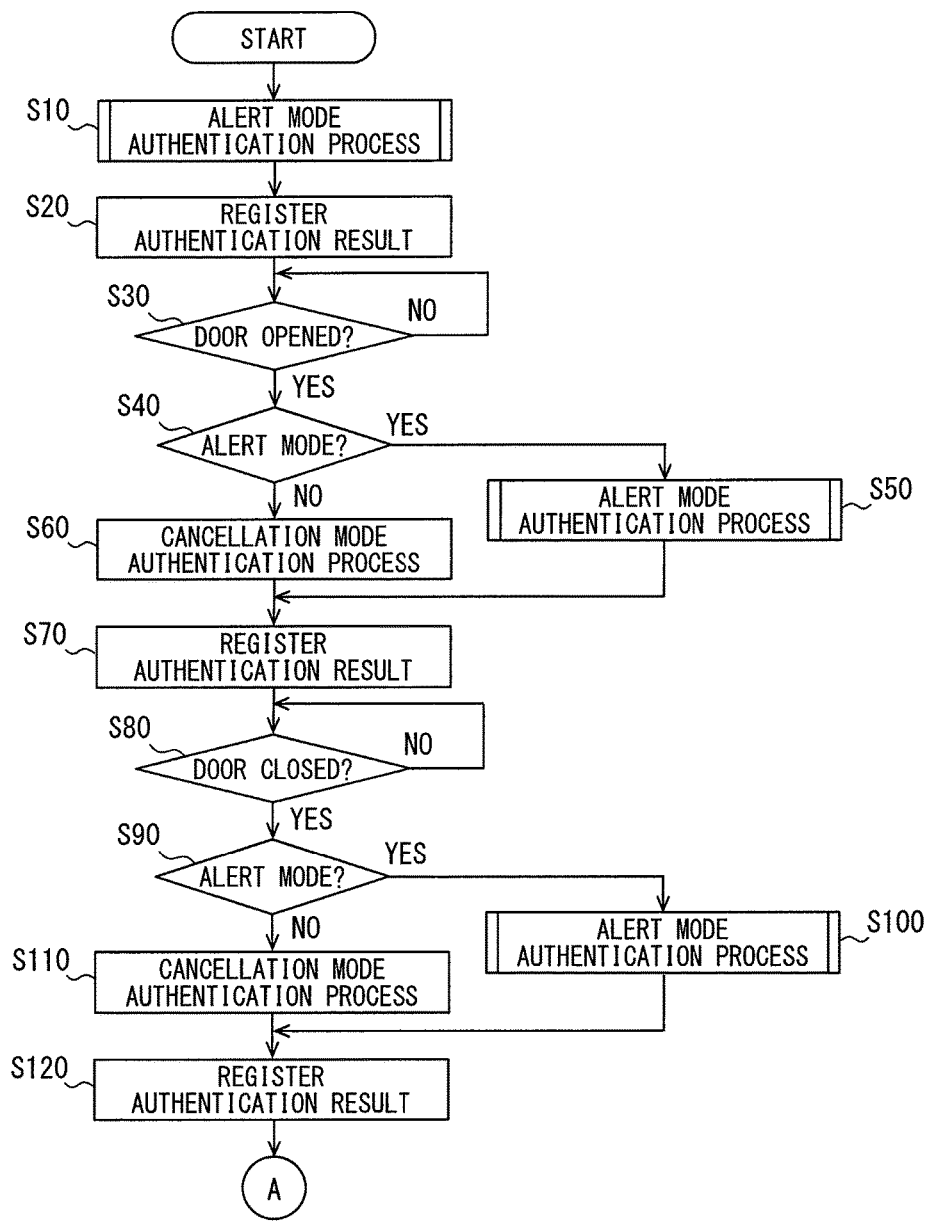
FIG. 9 is a flowchart illustrating a boarding related process to be executed by an authentication ECU.
Figure 10:
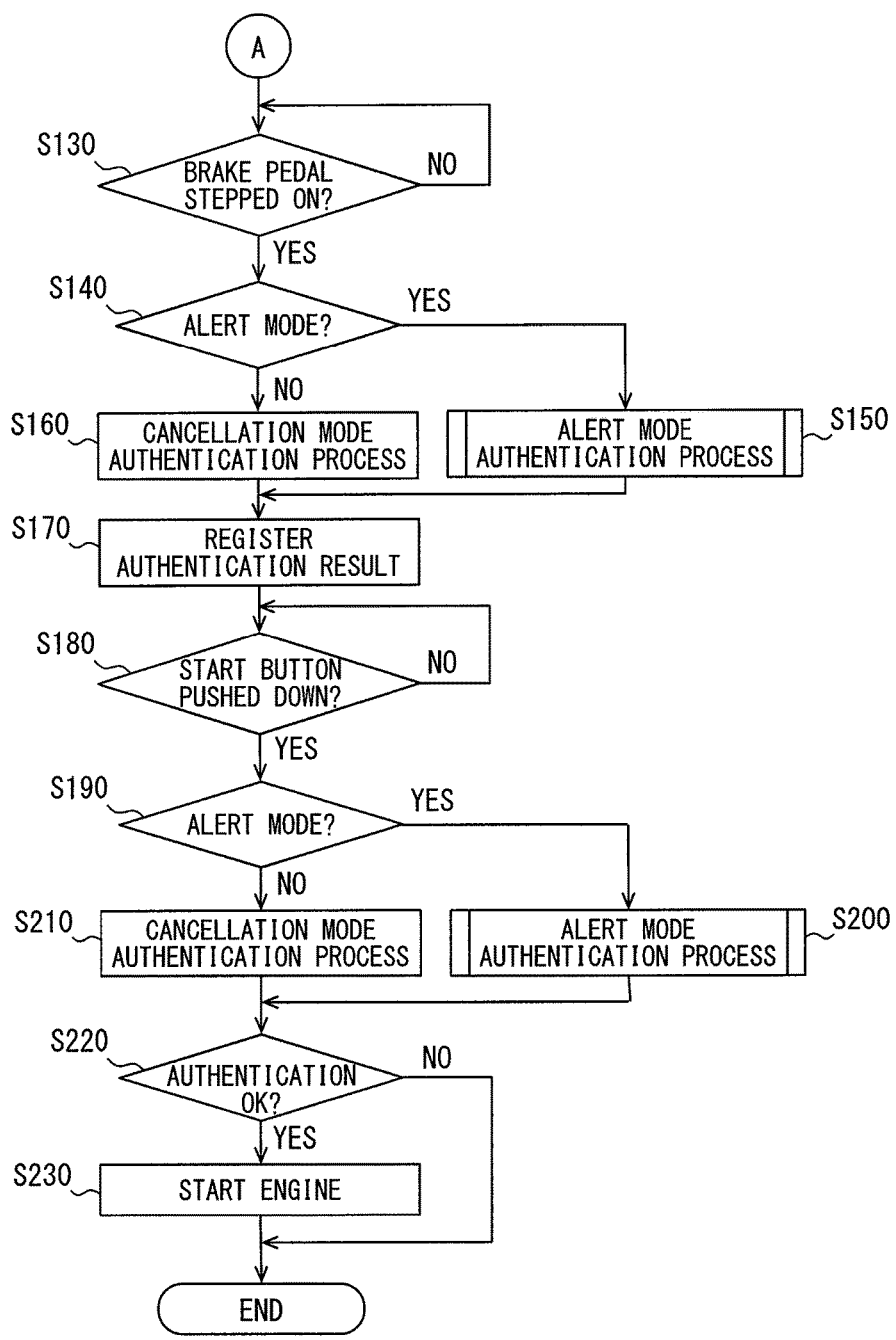
FIG. 10 is a flowchart subsequent to the flowchart shown in FIG. 9.

Next, processing (hereinafter referred to as boarding related process) to be executed by the authentication ECU 110 corresponding to a series of operations by the user to board the vehicle V in the parking state to start the engine will be described with reference to flowcharts shown in FIGS. 9 and 10. The flowchart shown in FIG. 9 may be started when a response signal to the polling signal is received. Since the vehicle V is in the parking state, the operation mode of the authentication ECU 110 at the time of starting the present flow is set to the alert mode.

Figure 11:
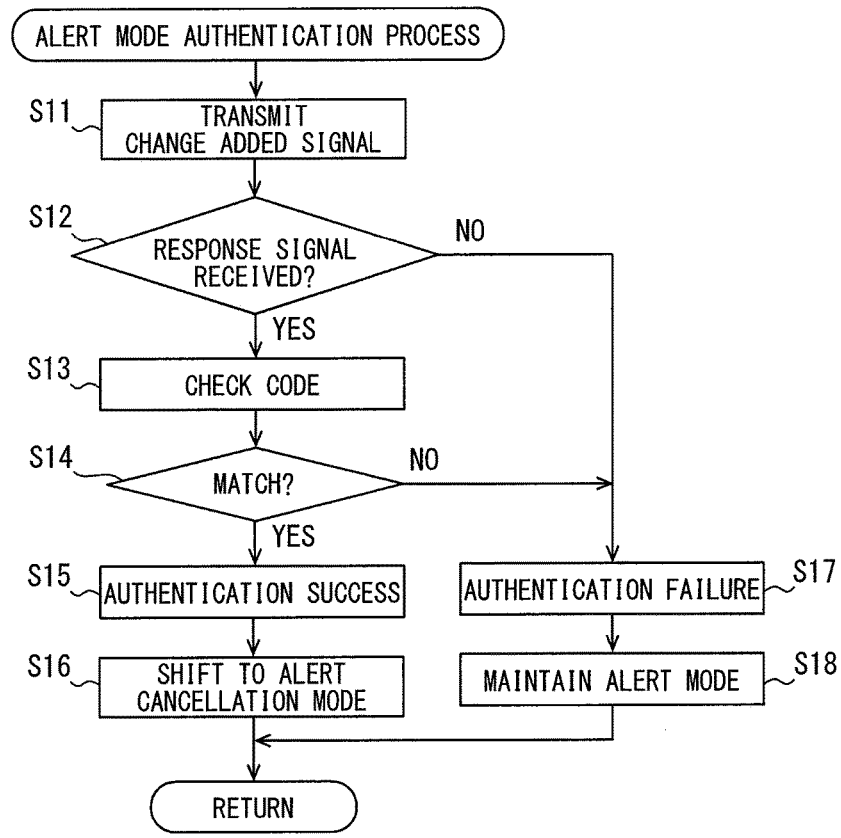
FIG. 11 is a flowchart illustrating an alert mode authentication process.

First, in Step S10, the authentication processing unit F4 executes the alert mode authentication process and proceeds to Step S20. The flowchart shown in FIG. 11 shows an example of a specific processing procedure for the alert mode authentication process. For the sake of convenience, before description of Step S20 and the following steps in FIG. 9, the alert mode authentication process will be described with reference to FIG. 11.

First, in Step S11, the authentication processing unit F4 transmits the change addition signal from the vehicle-side transmission antenna 120 (specifically, the vehicle exterior antennas 120B) in cooperation with the transmission control unit 114 and proceeds to Step S12. In Step S12, the authentication processing unit F4 determines whether the response signal has been received. If the response signal is received until a predetermined response waiting time (for example, 20 milliseconds) elapses after the change addition signal has been transmitted, an affirmative determination is made in Step S12 and the flow proceeds to Step S13. On the other hand, if the response signal has not been received even after the response waiting time has elapsed since the change addition signal has been transmitted, a negative determination is made in Step S12 and the process proceeds to Step S17.

In Step S13, the authentication processing unit F4 checks the response code included in the received response signal against the verification code generated by the authentication processing unit F4 per se. As a result of the checking in Step S13, if the two codes match each other, the affirmative determination is made in Step S14, and the process proceeds to Step S15. On the other hand, if the two codes do not match each other, the negative determination is made in Step S14, and the process proceeds to Step S17.

In Step S15, the authentication processing unit F4 determines that the authentication has succeeded and proceeds to Step S16. In Step S16, the mode control unit F3 sets the operation mode to the alert cancellation mode, and returns to a caller of the present flow.

In Step S17, the authentication processing unit F4 determines that authentication has failed and proceeds to Step S18. In Step S18, the mode control unit F3 keeps the operation mode in the alert mode and returns to the caller of the present flow. In other words, when the authentication in the alert mode authentication process fails, the alert mode is maintained.

Returning to FIG. 9 again, processing following Step S10 will be described. In Step S20, the authentication processing unit F4 registers the result of the alert mode authentication process in Step S10 in the RAM 1112 and proceeds to Step S30. In Step S30, the event detection unit F22 determines whether the door for the driver's seat has been opened based on the vehicle information (for example, the output of the courtesy switch) acquired by the vehicle information acquisition unit F1.

If it is detected that the driver's seat door has been opened, the affirmative determination is made in Step S30 and the process goes to Step S40. Until the driver's seat door is opened, the negative determination is made in Step S30, and the determination process in Step S30 is executed at a predetermined time interval (for example, 100 milliseconds). If the door has not been opened even after a lapse of a fixed time (for example, 3 minutes) since shifting to Step S30, the present flow may be ended.

By the way, even if the authentication in Step S10 fails and the key of the door is not in the unlocking ready state, the user can unlock the door key by leveraging the RKE function or the like. For that reason, even if the authentication process in Step S10 fails, the user can open the door by executing a predetermined operation.

In Step S40, the authentication processing unit F4 determines whether the current operation mode is the alert mode. If the operation mode is the alert mode, the affirmative determination is made in Step S40 and the process proceeds to Step S50. On the other hand, if the operation mode is the alert cancellation mode, the negative determination is made in Step S40 and the process proceeds to Step S60.

In Step S50, the authentication processing unit F4 executes the same alert mode authentication process as that in Step S10 and proceeds to Step S70. In Step S60, the authentication processing unit F4 executes the cancellation mode authentication process and proceeds to Step S70. A difference between the cancellation mode authentication process and the alert mode authentication process resides in only the type of the authentication signal to be transmitted. In other words, the process of replacing the signal transmitted in Step S11 of FIG. 11 with the non-addition signal corresponds to a cancellation mode authentication process. For that reason, a detailed description of the processing procedure of the cancellation mode authentication process will be omitted.

In Step S70, the authentication result in Step S50 or S60 is registered in the RAM 1112, and the process proceeds to Step S80. In Step S80, the event detection unit F22 determines whether the driver's seat door has been closed based on the vehicle information (for example, the output of the courtesy switch) acquired by the vehicle information acquisition unit F1.

If it is detected that the driver's seat door has been closed, the affirmative determination is made in Step S80 and the process goes to Step S90. Until the driver's seat door is closed, the negative determination is made in Step S80, and the determination process in Step S80 is executed at a predetermined time interval (for example, 100 milliseconds). If the door has not been closed even after a lapse of a fixed time (for example, 5 minutes) since shifting to Step S80, the present flow may be ended. Since the processing flow from Steps S90 to S120 is the same as the processing flow from Steps S40 to S70, the description of each step will be omitted. Upon completion of the registration process of the authentication result in Step S120, the process proceeds to Step S130.

In Step S130, the event detection unit F22 determines whether the brake pedal has been stepped on by the user based on the vehicle information acquired by the vehicle information acquisition unit F1. When it is detected that the brake pedal is stepped on by the user, the affirmative determination is made in Step S130 and the process goes to Step S140. The negative determination is made in Step S130 until the brake pedal is stepped on by the user, and the determination process in Step S130 is executed at a predetermined time interval (for example, 100 milliseconds). If the brake pedal has not been stepped on by the user even after a lapse of a fixed time (for example, 10 minutes) since shifting to Step S130, the present flow may be ended.

Since the processing flow from Steps S140 to S170 is the same as the processing flow from Steps S40 to S70, the description of each step will be omitted. Upon completion of the registration process of the authentication result in Step S170, the process proceeds to Step S180.

In Step S180, the event detection unit F22 determines whether the start button 140 has been pushed down by the user based on the vehicle information acquired by the vehicle information acquisition unit F1. When it is detected that the start button 140 has been pushed down by the user, the affirmative determination is made in Step S180 and the process goes to Step S190. The negative determination is made in Step S180 until the start button 140 is pushed down by the user, and the determination process in Step S180 is executed at a predetermined time interval (for example, 100 milliseconds). If the start button 140 has not been pushed down by the user even after a lapse of a fixed time (for example, 5 minutes) since shifting to Step S180, the present flow may be ended.

In Step S190, the authentication processing unit F4 determines whether the current operation mode is the alert mode. If the operation mode is the alert mode, the affirmative determination is made in Step S190 and the process proceeds to Step S200. On the other hand, if the operation mode is the alert cancellation mode, the negative determination is made in Step S190 and the process proceeds to Step S210. In Step S200, the authentication processing unit F4 executes the same alert mode authentication process as that in Step S10 and proceeds to Step S220. In Step S210, the authentication processing unit F4 executes the cancellation mode authentication process and proceeds to Step S220.

As a result of step S200 or S210, if the mobile device 200 has been successfully authenticated, the affirmative determination is made in Step S220 and the process proceeds to Step S230. In Step S230, the engine is started in cooperation with the engine ECU 170 and the present flow is ended. On the other hand, as a result of Step S200 or S210, if the authentication of the mobile device 200 has failed, the negative determination is made in Step S220 and the present flow is ended. In other words, when the authentication fails, the engine is not started.

<Overview of Present Embodiment>

With the above configuration, the authentication process according to the operation mode of the authentication ECU 110 is executed multiple times during a series of operations to board the vehicle V in the parking state to the start of the engine. Then, if the alert mode authentication process succeeds even once in the series of authentication processes, the authentication process using the non-addition signal (that is, the cancellation mode authentication process) is executed from the next time.

In other words, according to the configuration described above, as the authentication process, the authentication process using the change addition signal is not necessarily performed every time. If the alert mode authentication process succeeds in the process of the user approaching the parked vehicle V, the authentication process is executed with the use of the non-addition signal in the subsequent processes. For example, when the user is seated in the driver's seat and presses the start button, the cancellation mode authentication process is executed.

In the cancellation mode authentication process, since whether the strength change occurs is irrelevant to the determination of whether the mobile device 200 is to return the response signal even if the RSSI of the authentication signal is at the saturation level, the mobile device 200 returns the response signal to the authentication signal.

Figure 12:
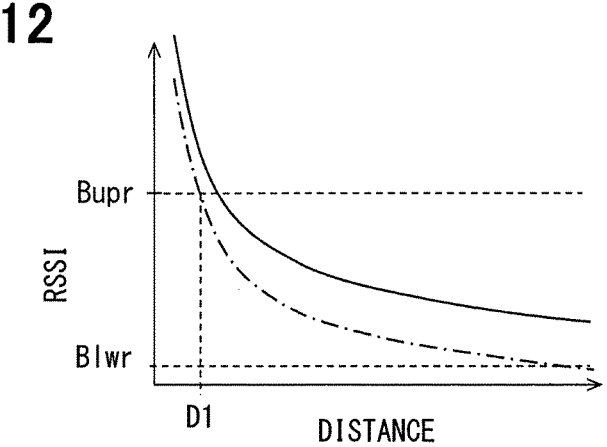
FIG. 12 is a diagram showing a relationship between a signal propagation distance and an RSSI.

By the way, since the RSSI decreases according to a signal propagation distance, the case of receiving the authentication signal transmitted at the suppression level from the in-vehicle system 100 at the saturation level is the case where the vehicle interior antenna 120A and the mobile device 200 are sufficiently close to each other as shown in FIG. 12. It is assumed that the vehicle interior antenna 120A and the mobile device 200 come close to each other as described above after the user is seated in the driver's seat.

In view of the above, the possibility that the signal strength of the authentication signal transmitted at the suppression level becomes the saturation level is small in the process that the user approaches the vehicle V which is in the parking state or at the timing of opening or closing the door for the driver's seat. For that reason, it can be expected that the alert mode authentication process will succeed before the mobile device 200 is placed in the vicinity of the vehicle interior antenna 120A.

Incidentally, an axis of ordinate in a graph shown in FIG. 12 represents RSSI, and an axis of abscissa represents a distance (hereinafter, a distance between the antennas) from the vehicle-side transmission antenna 120 to the mobile device 200. A solid line represents the transition of the RSSI of the signal transmitted at the default level and an alternate long and short dashed line represents the transition of the RSSI of the signal transmitted at the suppression level.

Bupr shown on the vertical axis represents an upper limit value of an output range of the RSSI detection circuit 221 and Blwr represents a lower limit value of the output range. A range from Blwr to Bupr is an output range of the RSSI detection circuit 221. D1 represents an antenna-to-antenna distance for receiving the authentication signal transmitted at the suppression level at the saturation level. In other words, when the mobile device 200 is disposed within a range where a distance from the vehicle interior antenna 120A falls within a range D1, the strength change is not detected in the strength change region.

In the configuration of Patent Literature 1, when no change in strength is observed in the authentication signal, the mobile device does not return the response signal. For that reason, when the mobile device 200 is placed within a range where the distance from the vehicle interior antenna 120A falls within D1 after the user boards the vehicle, the authentication process may fail.

On the other hand, according to the configuration of the present embodiment, there is a high possibility that the authentication process in the alert mode will succeed before the user is seated in the driver's seat, and once the alert mode authentication process is successful, the authentication process is performed with the use of the non-addition signal. Therefore, according to the configuration described above, the possibility that the mobile device 200 cannot be authenticated due to the fact that the change in the strength of the authentication signal cannot be detected can be reduced.

Specifically, the possibility that the mobile device 200 will not be authenticated due to the fact that the change in the strength of the authentication signal cannot be detected, for example, when the start button 140 is pushed down can be reduced. Naturally, that a reduction in the possibility that the mobile device 200 will not be authenticated corresponds to a reduction in the possibility of impairing the user's convenience.

When the vehicle is in the parking state, the mobile device 200 determines whether the response signal is to be returned based on whether the strength change occurs in the authentication signal. For that reason, as in Patent Literature 1, unauthorized authentication success due to the relay attack can be restricted. Therefore, according to the configuration described above, a reduction in the user's convenience can be restricted while the possibility that the authentication in the wireless communication between the in-vehicle device and the mobile device is illegally established is reduced.

The embodiments of the present disclosure have been described above. However, the present disclosure is not limited to the above-described embodiments, and various modifications described below also fall within the technical scope of the present disclosure. Further, the present disclosure can be implemented with various changes without departing from the spirit of the present disclosure, aside from the following modifications.

The members having the same functions as those in the members described in the above embodiment are denoted by the identical reference numerals, and a description of the same members will be omitted. Further, when referring to only a part of the configuration, the configuration of the embodiment described above can be applied to other portions.

(Modification 1)

In the above example, when the vehicle V is parked, the operation mode automatically switches from the alert cancellation mode to the alert mode, but the present disclosure is not limited to the above example. For example, the user may operate a predetermined input device (in other words, manually) to shift from the alert cancellation mode to the alert mode.

In addition, in recent years, there is a vehicle security system that can park the vehicle in a state where a security level of the vehicle is higher than that at the time of normal use (hereinafter referred to as high level) when the vehicle V is not used for a long trip or the like. In the vehicle equipped with such a vehicle security system, when the vehicle is parked with the security level set to the high level, the operation mode may shift to the alert mode.

(Modification 2)

Further, in the example described above, the operation mode shifts to the alert cancellation mode when the authentication process in the alert mode is successful, but the present disclosure is not limited to the above example. For example, in a case where the door is opened or closed after the authentication process in the alert mode is successful, the operation mode may switch from the alert mode to the alert cancellation mode. Further, when the authentication process in the alert mode succeeds a predetermined number of times (for example, twice), the alert mode may shift to the alert cancellation mode.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A vehicular electronic key system comprising:
    an in-vehicle device that is mounted on a vehicle; and
    a mobile device that is associated with the in-vehicle device and carried by a user of the vehicle, wherein
    the in-vehicle device performs a predetermined control process to the vehicle when an authentication process by a wireless communication between the in-vehicle device and the mobile device is successful, the in-vehicle device has two operation modes including an alert mode and an alert cancellation mode, the in-vehicle device is set to execute the authentication process a plurality of times during a series of operations supposed to be executed by the user when the user boards the vehicle that is parked and starts a power source of the vehicle, the in-vehicle device includes:
- a vehicle-side transmission unit that transmits an authentication signal used for authentication of the mobile device from a vehicle-side transmission antenna provided in the vehicle;
- a transmission strength adjustment unit that adjusts a strength of the authentication signal transmitted from the vehicle-side transmission antenna; and
- a mode control unit that controls the operation mode of the in-vehicle device, the authentication signal includes operation mode information indicating the operation mode of the in-vehicle device, when the in-vehicle device operates in the alert mode, the vehicle-side transmission unit transmits the authentication signal including a strength change signal that is a signal whose signal strength is changed with a predetermined pattern, the mode control unit sets the operation mode to the alert mode when the vehicle is parked, and switches the operation mode to the alert cancellation mode if the authentication of the mobile device is successful when the in-vehicle device operates in the alert mode, the mobile device includes:
- a mobile device-side reception unit that receives the authentication signal through the mobile device-side reception antenna;
- a reception strength detection unit that sequentially detects a received signal strength of the signal received by the mobile device-side reception unit;
- a strength change determination unit that determines whether the strength change with the predetermined pattern occurs in a strength change region that is a portion corresponding to the strength change signal among the authentication signals when receiving the authentication signal indicating that the in-vehicle device operates in the alert mode; and
- a mobile device-side transmission unit that transmits a response signal that is a signal as a response to the authentication signal, when the mobile device-side reception unit receives the authentication signal indicating that the in-vehicle device operates in the alert cancellation mode, the mobile device-side transmission unit returns the response signal, and when the mobile device-side reception unit receives the authentication signal indicating that the in-vehicle device operates in the alert mode, the mobile device-side transmission unit returns the response signal if the strength change determination unit determines that the strength change occurs, and the mobile device-side transmission unit does not return the response signal if the strength change determination unit determines that no strength change occurs in the strength change region.

2. The vehicular electronic key system according to claim 1, further comprising:
- a vehicle information acquisition unit that acquires vehicle information as information indicating a state of the vehicle from a sensor mounted on the vehicle; and
- an event detection unit that detects execution of a predetermined operation on the vehicle by the user as an occurrence of an authentication execution event for starting the authentication process, based on the vehicle information acquired by the vehicle information acquisition unit, wherein the vehicle-side transmission unit transmits the authentication signal according to the operation mode at the time when the occurrence of the authentication execution event is detected by the event detection unit, and at least any two of an event that a door for a driver's seat provided in the vehicle is opened, an event that the door for the driver's seat is closed, an event that a brake pedal is stepped on, an event that a parking brake is released, and an event that a start button for instructing a start of the power source is pushed down are registered as the authentication execution event.

3. The vehicular electronic key system according to claim 1, wherein the mode control unit sets the operation mode to the alert mode when all of doors provided in the vehicle are locked.

* * * * *